United States Patent [19]

Cohen

[11] Patent Number: 5,024,416
[45] Date of Patent: Jun. 18, 1991

[54] VALVE ACTUATOR

[75] Inventor: Mordechai Cohen, San Diego, Calif.

[73] Assignee: Sundstrand Corporation, Rockford, Ill.

[21] Appl. No.: 370,251

[22] Filed: Jun. 22, 1989

[51] Int. Cl.⁵ ............................................. F16K 31/44
[52] U.S. Cl. .................................... 251/78; 251/229; 74/104; 137/624.13
[58] Field of Search ................... 251/77, 78, 279, 229, 251/280, 58; 74/104; 137/624.13

[56] References Cited

U.S. PATENT DOCUMENTS

| | | | |
|---|---|---|---|
| Re. 19,703 | 9/1935 | Goldberg | 74/104 |
| 533,803 | 2/1895 | Gregson | 137/624.13 |
| 699,367 | 5/1902 | Brewington | 251/77 |
| 1,307,704 | 6/1919 | Sather | 251/78 |
| 2,346,916 | 4/1944 | Halford et al. | 251/78 |
| 3,342,454 | 9/1967 | Tutch | 251/78 |
| 3,474,829 | 10/1969 | Scheineman | 251/280 |
| 3,610,568 | 10/1971 | Dawe | 251/58 |
| 3,672,262 | 6/1972 | Karr | 74/104 |
| 3,737,142 | 6/1973 | Boswell et al. | 251/58 |
| 4,226,814 | 10/1980 | Dirda | 251/78 |
| 4,313,592 | 2/1982 | Baas | 251/228 |
| 4,483,507 | 11/1984 | Clark | 251/58 |
| 4,690,168 | 9/1987 | Kihm | 251/279 |
| 4,765,589 | 8/1988 | Sawze | 251/229 |

FOREIGN PATENT DOCUMENTS 1194244 6/1970 United Kingdom ................ 251/229

Primary Examiner—A. Michael Chambers
Attorney, Agent, or Firm—Wood, Phillips, Mason, Recktenwald & VanSanten

[57] ABSTRACT

The problem of providing a very compact and simple actuator system (10) for a rotary valve (40) operated by a rotatable shaft (44) and effecting a specific valve program to select a desired flow rate through the valve (40) is provided by an actuator member (12) movable in a linear path (A) transverse to the axis of the shaft. The actuator member (12) is linearly movable through a stroke range to effect changing the angular settings of the shaft (44) to move the valve (40) from an open position to a closed position and back to an open position in response to a single unidirectional stroke of the actuator member (12). A pair of link arms (26a, 26b) operatively connect the actuator member (12) and the shaft (40) for transmitting linear movement of the actuator member to angular movement of the shaft. The link arms are pivotally connected to each other at adjacent ends (28). An opposite end (30) of one link arm (26a) is fixed to the shaft, and an opposite end (34) of the second link arm (26b) is pivotally connected to the actuator member (12). The connection between the second link arm (26b) and the actuator member (12) is in the form of a pin-and-slot (32, 34) connection to provide for lost motion such that the actuator member (12) moves through a portion of its stroke without effecting angular movement of the shaft (44) before effecting a change in the angular setting of the shaft.

12 Claims, 2 Drawing Sheets

VALVE ACTUATOR

FIELD OF THE INVENTION

This invention generally relates to valve actuators and, particularly, to a valve actuator for opening and closing a rotary valve such as a butterfly or globe valve.

BACKGROUND OF THE INVENTION

There are various environments wherein it is desirable to control the opening and closing of a rotary valve, such as a butterfly valve, in a particular sequence or program. This is particularly true in aerospace applications but wherein space and weight parameters are critical. In just one example, a bleed valve may be used to modulate the discharge of compressor air to ambient during engine transients.

A common approach to actuating rotary valves is to use rotary actuators which can be designed with gear trains, including elliptical gears or the like, for providing a rotational sequence or program for the rotating valve.

A problem with such prior valve actuators is that they are quite complicated, require heavy components such as gears, have large packaging requirements and, in essence, simply are not desirable for aerospace or aircraft applications.

This problem further is magnified when it is desirable to actuate a rotary valve from a fully closed position to a fully opened position and back to the closed position during a single portion of the valve actuating program.

This invention is directed to solving these problems by providing a valve actuator which is unique in its simplicity for carrying out a rather complicated opening and closing program for the rotary valve.

SUMMARY OF THE INVENTION

An object, therefore, of the invention is to provide a new and improved valve actuator particularly adapted for opening and closing a rotary valve such as a butterfly valve.

In the exemplary embodiment of the invention, an actuator system is disclosed for a valve having a closure member operated by a rotatable shaft to select a desired flow rate through the valve. An actuator member is movable in a linear path transverse to the axis of the shaft through a stroke range to effect changing angular settings of the shaft about its axis. Generally, linkage means are operatively connected between the actuator member and the shaft for transmitting linear movement of the actuator member to angular movement of the shaft. The linkage means include lost motion means such that the actuator member moves through a portion of its stroke range without effecting angular movement of the shaft before effecting a change in the angular setting of the shaft.

More particularly, the linkage means are connected to the shaft by a pin-and-slot connection, with the actuator member having an elongated slot of the pin and slot connection extending in the direction of its linear path of movement. The linkage means include first and second link arms pivotally connected to each other at adjacent ends. An opposite end of the first link arm is fixed to the shaft. An opposite end of the second link arm is connected to the actuator member through a pin of the pin-and-slot connection. The pin extends generally parallel to the axis of the shaft.

The link arms and their pivoted or connected ends are located relative to the actuator member and its slot such that, in combination with their dimensional parameters and the length of the slot, effects an actuating program for the valve wherein the valve remains closed during a substantial portion of the stroke range of the actuator member, the valve then being opened during a second substantial portion of the stroke range and then being closed during a third or final small portion of the stroke range.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figures 1, 2:
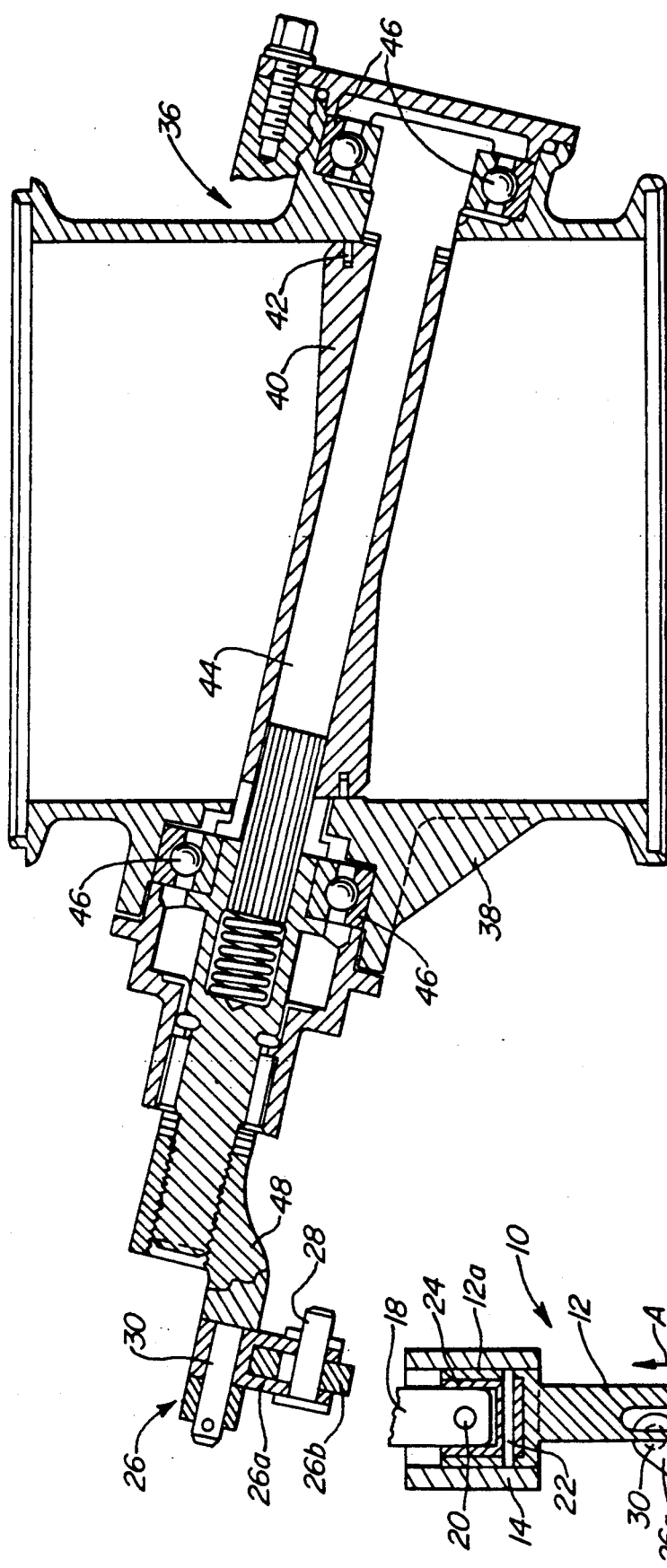
FIG. 1 is an axial section through the actuator member of the valve actuator system of the invention.
FIG. 2 is an axial section through a valve housing incorporating a butterfly valve for actuation by the actuator system of the invention.

Referring to the drawings in greater detail, and first to FIG. 1, the mechanical components of an actuator system, generally designated 10, are shown. The system is designed for rotating a valve having a closure member, such as a butterfly valve, operated by a rotatable shaft to select a desired flow rate through the valve, as described hereinafter in relation to FIG. 2.

Actuator system 10 includes an actuator member 12 in the form of a glide arm having an enlarged cylindrical portion 12a at one end and an enlarged cylindrical portion 12b at its opposite end. Portion 12a is reciprocally mounted within an upper (as viewed in the drawing) guide cylinder or sleeve 14, and portion 12b is reciprocally mounted in a lower guide sleeve or cylinder 16. The glide arm is movable in the direction of double-headed arrow "A" by an appropriate means, such as a piston rod 18 pinned to upper portion 12a of the glide arm by means of pins 20 and 22 extending through piston 18 and glide arm 12a, as well as a through cup-shaped bushing 24, in diametrically opposite directions. Therefore, actuator member or glide arm 12 is movable in a linear path through a stroke range to effect changing angular settings of a valve shaft about its axis, as will be described in greater detail hereinafter.

Still referring to FIG. 1, actuator system 10 further includes linkage means, generally designated 26, which include a first link arm 26a and a second link arm 26b. Generally, linkage means 26 operatively connects glide arm 12 and the valve shaft for transmitting linear movement of the glide arm to angular movement of the shaft, as also described in greater detail hereinafter. Suffice it to say at this point, link arms 26a, 26b are pivotally connected to each other at adjacent ends by a pivot pin 28. An opposite end of link arm 26a is fixed to the valve shaft, as at 30.

The linkage means 26 between glide arm 12 and the valve shaft include lost motion means such that the glide arm moves through a portion of its stroke range without effecting angular movement of the valve shaft before effecting a change in the angular setting of the shaft. More particularly, this lost motion means is provided by an elongated slot 32 formed in the glide arm and extending generally parallel to its stroke or in the direction of its linear path of travel indicated by double-headed arrow "A". An opposite end of link arm 26b has a pin 34 extending into slot 32, the pin extending generally parallel to the axis of the valve shaft.

Referring to FIG. 2, a butterfly valve assembly, generally designated 36, is shown for illustrative purposes in order to illustrate the operative association of linkage means 26 and its link arms in relation to the valve and its valve shaft. The valve assembly itself does not form part of the invention except to the extent of its combination with the novel actuator system of the invention. Suffice it to say, valve assembly 36 includes a valve housing 38 within which a butterfly valve 40, having a conventional split ring seal 42, is mounted on a valve shaft 44 in a conventional configuration. Valve shaft 44 is journaled on valve housing 38 by means of appropriate bearings 46.

Linkage means 26 can be seen in FIG. 2 at the left-hand side thereof as associated with an offset portion 48 of valve shaft 44. Looking at this depiction in combination with FIG. 1, link arm 26a can be seen fixed to valve shaft portion 48, as by a splined pin connection at 30, and pin 28 can be seen pivotally connecting link arm 26a and link arm 26b as described in relation to FIG. 1. Therefore, it can be understood that rotation of link arm 26a about an axis defined by pin 30, the pin extending parallel to valve shaft 44, is effective to rotate the valve shaft and rotate butterfly valve 40 through a rotational program defined by the rotation or pivoting program of movement of link arm 26a.

Figure 3:
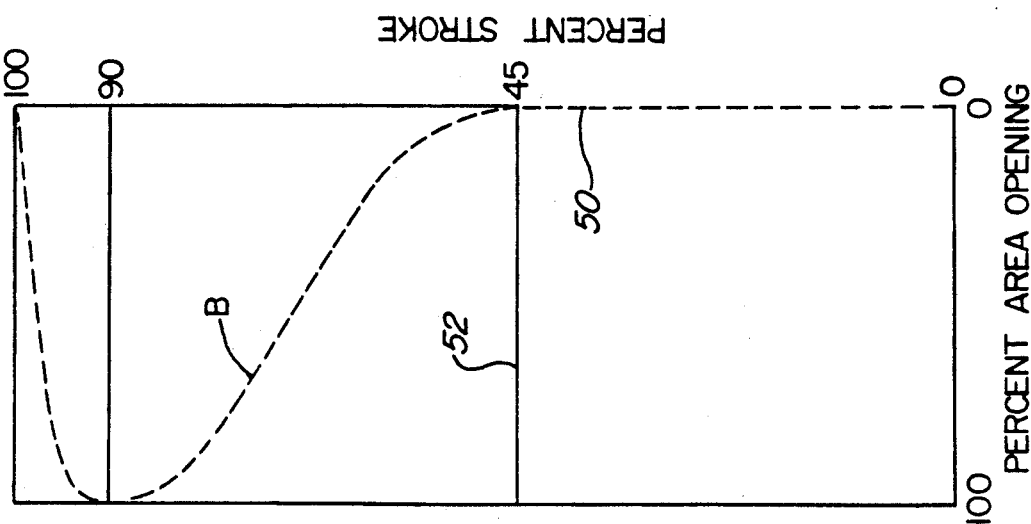
FIG. 3 is a graph of the valve opening and closing program effected by the actuator system of the invention.

FIG. 3 illustrate an opening and closing program for the butterfly valve as effected by the actuator system 10 of the invention. It can be seen that the right-hand, bottom corner of the graph is the "zero" reference, with the "percent stroke" range of actuator member or glide arm 12 running upwardly from the zero reference point, and the "percent area opening" of the butterfly valve running to the left from the zero reference point. In other words, the graph represents a full stroke range for the glide arm from "zero" upwardly to its full stroke limit.

In further understanding the valve opening and closing program represented by the graph in FIG. 3, reference should be made back to FIG. 1 to observe the position of glide arm 12, the position of pin 34 in lost motion slot 32, and the position of link arms 26a, 26b. In this combined positional relationship shown in FIG. 1, the components are in a position at which the glide arm has moved approximately 40% of its stroke range. This is shown at point 50 on the graph of FIG. 3. In other words, it can be seen in FIG. 1 that pin 34 has not quite bottomed out at the lower end of slot 32. Once the pin bottoms out, the components will be in a position represented by the 45% point indicated by line 52 in FIG. 3.

With the above understanding of the lost motion connection in relation to the graph of FIG. 3, it can be understood that during a substantial portion of its stroke range, on the order of 45%, glide arm 12 will move upwardly (as viewed in FIG. 1) without effecting any movement of linkage means 26 and, in turn, without effecting any rotation of the butterfly valve. Once pin 34 bottoms out in slot 32 (actually, the slot bottom "picks up" the pin), the actuator system is effective to completely open and then completely close the valve in the remaining stroke range of the glide arm, as indicated by the upper portions of dotted line "B" in the graph of FIG. 3.

Figure 4:
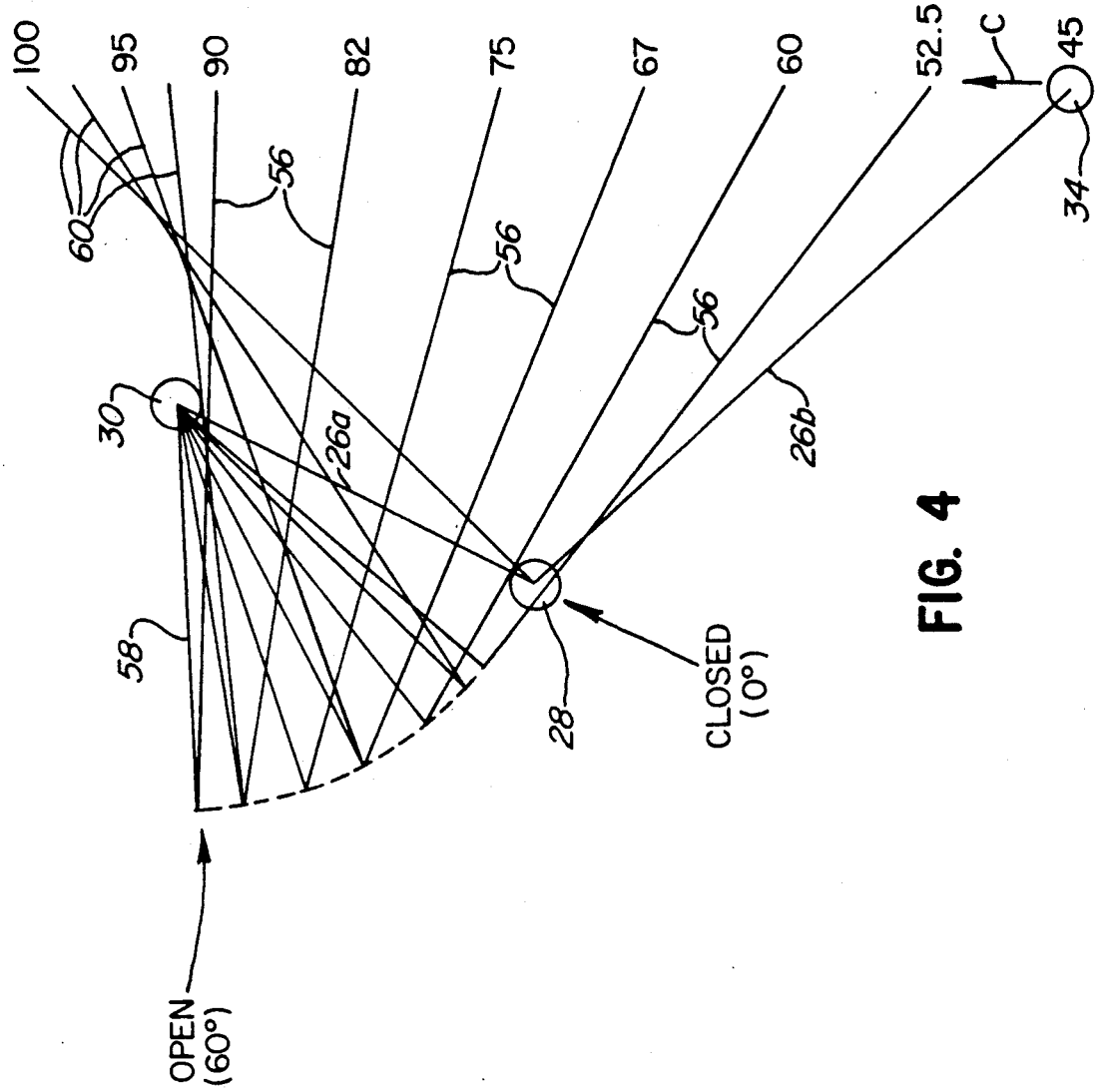
FIG. 4 is a schematic layout of the sequence of movement of the link arms of the linkage means forming part of the actuator system.

The operation of link arms 26a, 26b in effecting the valve opening and closing program of FIG. 3 can better be understood by reference to the schematic layout of FIG. 4. In this layout, link arms 26a and 26b are represented by darkened lines with pins 34, 28 and 30 represented by circles. In other words, pin 30 is fixed to the valve shaft, pin 28 pivotally interconnects adjacent ends of link arms 26a and 26b, and pin 34 moves within slot 32 of glide arm 12 as indicated by arrow "C" in FIG. 4. To correlate the layout of FIG. 4 with the graph of FIG. 3, the right-hand end of the layout represents the upper right-hand portion of the graph.

It can be understood from FIG. 4 that as pin 34 bottoms out in slot 32 and moves upwardly with the glide arm 12 in the direction of arrow "C", link arm 26b sort of "pushes" on arm 26a through pin 28. As pin 34 moves upwardly, link arm 26b swings in a multifaceted path as indicated by lines 56. This action is effective to rotate link arm 26a about pivot 30 to a position as indicated by line 58. This represents a fully opened position of the butterfly valve (the valve being considered fully open at a 60 degree position of rotation), but the actuator member or glide arm 12 has moved only 90% of its full stroke range. As pin 34 is moved further upwardly to move link arm 26b in its path of travel, as indicated by lines 60, between 90% and 100% of the full stroke range of the glide arm, link arm 26b now sort of "pulls" on link arm 26a to bring the link arm back to the closed position as indicated by reference numeral 26a in FIG. 4. In other words, a toggle arrangement is provided to open the valve in one direction and close the valve in the opposite direction in response to a singular directional stroke of the actuator member or glide arm.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An actuator system for a rotary valve operated by a rotatable shaft to select a desired flow rate through the valve, comprising:

an actuator member movable in a linear path transverse to the axis of said shaft through a stroke range for changing angular settings of the shaft about its axis; and linkage means operatively connected between the actuator member and the shaft for transmitting linear movement of the actuator member to angular movement of the shaft, including lost motion means in the form of a pin-and-slot connection such that the actuator member moves through a portion of its stroke range without effecting angular movement of the shaft before effecting a change in the angular setting of the shaft, said linkage means including first and second link arms pivotally connected to each other at adjacent ends.

2. The actuator system of claim 1 wherein said linkage means are connected to the actuator member by the pin-and-slot connection.

3. The actuator system of claim 2 wherein said actuator member has a slot of the pin-and-slot connection extending in the direction of said linear path.

4. The actuator system of claim 3 wherein said linkage means has a pin of the pin-and-slot connection extending into said slot, the pin extending generally parallel to the axis of the shaft.

5. The actuator system of claim 1 wherein an opposite end of said first link arm is fixed to the shaft and an opposite end of the second link arm is connected to the actuator member through said lost motion means.

6. An actuator system for a rotary valve operated by a rotatable shaft to select a desired flow rate through the valve, comprising:

an actuator member movable in a linear path transverse to the axis of said shaft through a stroke range for changing angular settings of the shaft about its axis; and linkage means including first and second link arms operatively connected between the actuator member and the shaft for transmitting linear movement of the actuator member to angular movement of the shaft, the first and second link arms being pivotally connected to each other at adjacent ends, and including lost motion means in the form of a pin-and-slot connection between the linkage means and the actuator member such that the actuator member moves through a portion of its stroke without effecting angular movement of the shaft before effecting a change in the angular setting of the shaft.

7. The actuator system of claim 6 wherein said actuator member has a slot of the pin-and-slot connection extending in the direction of said linear path.

8. The actuator system of claim 7 wherein one of said link arms is connected to a pin of the pin-and-slot connection, the pin extending into the slot generally parallel to the axis of the shaft.

9. The actuator system of claim 6 wherein an opposite end of said first link arm is fixed to the shaft and an opposite end of the second link arm is connected to the actuator member through a pin extending into the slot of the pin-and-slot connection.

10. An actuator system for a rotary valve operated by a rotatable shaft to select a desired flow rate through the valve, comprising:

an actuator member movable in a linear path transverse to the axis of said shaft through a stroke range for changing angular settings of the shaft about its axis; and linkage means operatively connected between the actuator member and the shaft for transmitting linear movement of the actuator member to angular movement of the shaft, including lost motion means in the form of a pin-and-slot connection such that the actuator member moves through a portion of its stroke without effecting angular movement of the shaft followed by the shaft and valve being rotated between a closed position and an open position and back to the closed position during a single unidirectional stroke of the actuator member, said linkage means including first and second link arms pivotally connected to each other at adjacent ends.

11. The actuator system of claim 10 wherein an opposite end of said first link arm is fixed to the shaft and an opposite end of the second link arm is pivotally connected to the actuator member.

12. The actuator system of claim 11 wherein said lost motion means is between the second link arm and the actuator member.

* * * * *